(12) United States Patent
Remis et al.

(10) Patent No.: US 11,182,143 B2
(45) Date of Patent: Nov. 23, 2021

(54) ADJUSTMENT OF VOLTAGE REGULATOR FIRMWARE SETTINGS BASED UPON AN EFFICIENCY SCORE

(71) Applicant: LENOVO Enterprise Solutions (Singapore) PTE. LTD., New Tech Park (SG)

(72) Inventors: Luke Remis, Raleigh, NC (US); Brian Totten, Durham, NC (US); Jamaica Barnette, Durham, NC (US)

(73) Assignee: LENOVO Enterprise Solutions (Singapore) PTE. LTD., New Tech Park (SG)

( * ) Notice: Subject to any disclaimer, the term of this patent is extended or adjusted under 35 U.S.C. 154(b) by 455 days.

(21) Appl. No.: 15/296,332

(22) Filed: Oct. 18, 2016

(65) Prior Publication Data

US 2018/0107470 A1    Apr. 19, 2018

(51) Int. Cl.
*G06F 8/65* (2018.01)
*G06F 1/26* (2006.01)

(52) U.S. Cl.
CPC ............. *G06F 8/65* (2013.01); *G06F 1/26* (2013.01); *Y02D 10/00* (2018.01)

(58) Field of Classification Search
CPC .......... G06F 1/26; G06F 8/60–71; G06F 8/65; Y02D 10/42; Y02D 10/00
See application file for complete search history.

(56) References Cited

U.S. PATENT DOCUMENTS

| 8,594,850 | B1 | 11/2013 | Gourlay et al. |
| 9,904,587 | B1* | 2/2018 | Potlapally ............. G06F 11/079 |
| 10,083,026 | B1 | 9/2018 | Venkata et al. |
| 2005/0028017 | A1* | 2/2005 | Janakiraman ............. H02J 1/10 |
| | | | 713/340 |

(Continued)

FOREIGN PATENT DOCUMENTS

| CN | 106293789 A | 1/2017 |
| WO | 2017003482 A1 | 1/2017 |

OTHER PUBLICATIONS

U.S. Appl. No. 15/295,894, Notice of Allowance dated Aug. 29, 2018.

(Continued)

*Primary Examiner* — S. Sough
*Assistant Examiner* — Stephen D Berman
(74) *Attorney, Agent, or Firm* — Kunzler Bean & Adamson; Bruce R. Needham

(57) ABSTRACT

An apparatus for voltage regulation device adjustment includes a rating module that determines an efficiency score for a current firmware of a voltage regulation device ("VRD"). The efficiency score describes a power efficiency for the VRD based on a configuration of an electronic device where the VRD is installed. The apparatus includes a comparison module that compares the determined efficiency score for the current firmware with a predetermined efficiency score for a different firmware for the VRD. The apparatus includes a firmware module that selects the different firmware for the VRD in response to determining that (Continued)

the VRD is less efficient with the current firmware than with the different firmware based on the comparison of the efficiency score for the current firmware with the predetermined efficiency score for the different firmware.

20 Claims, 5 Drawing Sheets

(56) References Cited

U.S. PATENT DOCUMENTS

| | | | | |
|---|---|---|---|---|
| 2008/0086652 A1* | 4/2008 | Krieger | ............ | G06F 1/26 |
| | | | | 713/330 |
| 2008/0184221 A1* | 7/2008 | Rengarajan | ............ | G06F 8/65 |
| | | | | 717/173 |
| 2008/0229127 A1* | 9/2008 | Felter | ............ | G06F 1/3203 |
| | | | | 713/320 |
| 2008/0295087 A1 | 11/2008 | Kang et al. | | |
| 2009/0089604 A1* | 4/2009 | Malik | ............ | G06F 1/28 |
| | | | | 713/340 |
| 2009/0256537 A1 | 10/2009 | Sato et al. | | |
| 2010/0199078 A1 | 8/2010 | Shih et al. | | |
| 2011/0078435 A1* | 3/2011 | Krieger | ............ | G06F 1/26 |
| | | | | 713/100 |
| 2011/0208372 A1* | 8/2011 | Hansen | ............ | G05F 1/67 |
| | | | | 700/297 |
| 2012/0124568 A1* | 5/2012 | Fallon | ............ | G06F 9/453 |
| | | | | 717/169 |
| 2012/0226922 A1 | 9/2012 | Wang et al. | | |
| 2013/0057297 A1* | 3/2013 | Cheng | ............ | H02M 1/32 |
| | | | | 324/548 |
| 2014/0108630 A1* | 4/2014 | Barnes | ............ | G06F 9/50 |
| | | | | 709/223 |
| 2014/0115574 A1 | 4/2014 | Valentine et al. | | |
| 2014/0282486 A1 | 9/2014 | Hisamoto et al. | | |
| 2014/0336791 A1 | 11/2014 | Asenjo et al. | | |
| 2015/0007161 A1 | 1/2015 | Yagi | | |
| 2015/0212815 A1* | 7/2015 | Joshi | ............ | G06F 8/71 |
| | | | | 717/122 |
| 2016/0147546 A1 | 5/2016 | Chao et al. | | |
| 2016/0182758 A1 | 6/2016 | Minamino | | |
| 2017/0031671 A1* | 2/2017 | Joshi | ............ | G06F 8/654 |
| 2017/0110898 A1* | 4/2017 | Kyriakoulis | ............ | H02J 7/342 |
| 2017/0249135 A1 | 8/2017 | Gandhi et al. | | |
| 2017/0257303 A1* | 9/2017 | Boyapalle | ............ | H04L 67/34 |
| 2017/0300313 A1 | 10/2017 | Gantt, Jr. et al. | | |
| 2018/0354379 A1 | 12/2018 | Wu | | |

OTHER PUBLICATIONS

U.S. Appl. No. 15/295,848, Office Action Summary, dated Jan. 15, 2019, pp. 1-34.
U.S. Appl. No. 15/295,848, Final Office Action, dated Aug. 15, 2019.
U.S. Appl. No. 15/295,894, Office Action, dated Apr. 4, 2018.
U.S. Appl. No. 15/295,848, Office Action, dated Dec. 19, 2019.
U.S. Appl. No. 15/295,848, Final Office Action, dated Jun. 18, 2020, pp. 1-36.

* cited by examiner

ADJUSTMENT OF VOLTAGE REGULATOR FIRMWARE SETTINGS BASED UPON AN EFFICIENCY SCORE

FIELD

The subject matter disclosed herein relates to voltage regulation devices and more particularly relates to adjusting settings for a voltage regulation device based on an efficiency score.

BACKGROUND

Computers, smartphones, data center equipment, consumer electronics, and other equipment typically are powered using a voltage regulation device ("VRD") that converts voltage from a utility, a generator, a battery pack, solar panels, or other source to another voltage. Often, alternating current ("AC") voltage is converted to direct current ("DC") voltage to be used for powering electronic components on an electronic device. For example, a central processing unit ("CPU") often demands various DC voltages that are very low compared to distribution voltages in power lines leading to the electronic device.

When an electronic device is shipped from a factory, the electronic device may be modified to add components, such as memory, peripheral devices, storage devices, CPUs, etc. However, the manufacturer often plans for the worst case scenario where all of the electronic device is populated with components or when the components are operating at a peak value. Typically, VRDs include switchmode power converters that include switches, inductors, capacitors, etc. that operate on a fixed or variable duty cycle to convert an input voltage to a regulated output voltage. Typical switchmode power converters are often less efficient at light load. In addition, some VRDs include multiple phases wired in parallel that each can produce power to contribute to a load. The settings for a VRD, which are often included in VRD firmware, from the factory for worst case conditions may not be as efficient as when the electronic device has an actual configuration with less than the full complement of components.

BRIEF SUMMARY

An apparatus for voltage regulation device adjustment is disclosed. A method and computer program product also perform the functions of the apparatus. The apparatus includes a rating module that determines an efficiency score for a current firmware of a voltage regulation device ("VRD"). The efficiency score describes a power efficiency for the VRD based on a configuration of an electronic device where the VRD is installed. The apparatus also includes a comparison module that compares the determined efficiency score for the current firmware with a predetermined efficiency score for a different firmware for the VRD. The apparatus further includes a firmware module that selects the different firmware for the VRD in response to determining that the VRD is less efficient with the current firmware than with the different firmware based on the comparison of the efficiency score for the current firmware with the predetermined efficiency score for the different firmware.

In one embodiment, the apparatus includes a reference module that maintains a firmware table including one or more entries that each correspond to a different firmware for the VRD. Each entry may include a firmware, a configuration for the electronic device, and an efficiency score for the firmware based on the configuration of the electronic device. In a further embodiment, the reference module dynamically updates the firmware table for the current firmware based on the determined efficiency score for the current firmware and the configuration of the electronic device.

In some embodiments, the firmware module selects the different firmware from the firmware table according to the configuration of the electronic device and the efficiency score of the different firmware associated with the configuration of the electronic device. In various embodiments, the apparatus includes a monitor module that monitors, on an ongoing basis, one or more power efficiency characteristics associated with the VRD while the VRD is loaded with the current firmware. The rating module may determine the efficiency score for the current firmware at a certain point in time based on the one or more power efficiency characteristics.

In a further embodiment, the one or more power efficiency characteristics include a temperature associated with the VRD. The temperature may include an ambient temperature associated with the electronic device, a temperature of a central processing unit ("CPU"), a temperature of a memory unit, and/or a temperature of a peripheral device. In one embodiment, the one or more power efficiency characteristics include a VRD utilization. The VRD utilization may be determined based on a measurement of an input voltage, an output voltage, an input current, and/or an output current.

In one embodiment, the configuration of the electronic device includes a hardware configuration for the electronic device and/or an application configuration for each of one or more applications executing on the electronic device. The rating module may determine the efficiency score for the current firmware based on the configuration of the electronic device.

In certain embodiments, the apparatus includes a configuration module that determines the hardware configuration of the electronic device. Determining the hardware configuration may include determining which hardware components are installed in the electronic device and information about the installed components. The information about a hardware component may be determined based on a model number for the hardware component and one or more performance characteristics of the hardware component that are monitored while it is active.

In one embodiment, the apparatus includes an application module that determines the application configuration for each of the one or more applications executing on the electronic device and one or more effects of each application on one or more hardware components of the electronic device. The one or more effects of an application may be determined based on one or more of user input and one or more performance characteristics of the application that are monitored while it executes.

In some embodiments, the firmware module selects the different firmware in response to the efficiency score of the current firmware being outside a threshold range of the efficiency score of the different firmware. In various embodiments, the apparatus includes a change module that detects a change in the configuration of the electronic device, and determines a firmware for the VRD that has a best efficiency score for the changed configuration.

In one embodiment, the firmware module loads the different firmware in the VRD in real-time in response to the change module detecting the change in the configuration of the electronic device. In some embodiments, a firmware for the VRD manages one or more power settings of the VRD based on the configuration of the electronic device where the VRD is installed. In further embodiments, the one or more power settings of the VRD include an output voltage setpoint, a current setpoint, a control parameter, a parameter of a component within the VRD, and/or a switching parameter.

In one embodiment, the one or more power settings of the VRD include selection of one or more phases of the VRD for operation. The one or more phases may include switchmode power converters connected in parallel. Each switchmode power converter may provide power from the VRD when selected. In some embodiments, the apparatus further includes the electronic device.

A method for voltage regulation device adjustment includes determining an efficiency score for a current firmware of a voltage regulation device ("VRD"). The efficiency score describes a power efficiency for the VRD based on a configuration of an electronic device where the VRD is installed. The method also includes comparing the determined efficiency score for the current firmware with a predetermined efficiency score for a different firmware for the VRD. The method further includes selecting the different firmware for the VRD in response to determining that the VRD is less efficient with the current firmware than with the different firmware based on the comparison of the efficiency score for the current firmware with the predetermined efficiency score for the different firmware.

The method, in a further embodiment, includes maintaining a firmware table including one or more entries that each correspond to a different firmware for the VRD. Each entry may include a firmware, a configuration for the electronic device, and an efficiency score for the firmware based on the configuration of the electronic device. In certain embodiments, the method includes dynamically updating the firmware table for the current firmware based on the determined efficiency score for the current firmware and the configuration of the electronic device. In various embodiments, the method includes selecting the different firmware from the firmware table according to the configuration of the electronic device and the efficiency score of the different firmware associated with the configuration of the electronic device.

A computer program product includes a computer readable storage medium that has program instructions embodied therewith. The program instructions are executable by a processor to cause the processor to determine an efficiency score for a current firmware of a voltage regulation device ("VRD"). The efficiency score describes a power efficiency for the VRD based on a configuration of an electronic device where the VRD is installed.

The program instructions are further executable by a processor to cause the processor to compare the determined efficiency score for the current firmware with a predetermined efficiency score for a different firmware for the VRD. The program instructions are also executable by a processor to cause the processor to select the different firmware for the VRD in response to determining that the VRD is less efficient with the current firmware than with the different firmware based on the comparison of the efficiency score for the current firmware with the predetermined efficiency score for the different firmware.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
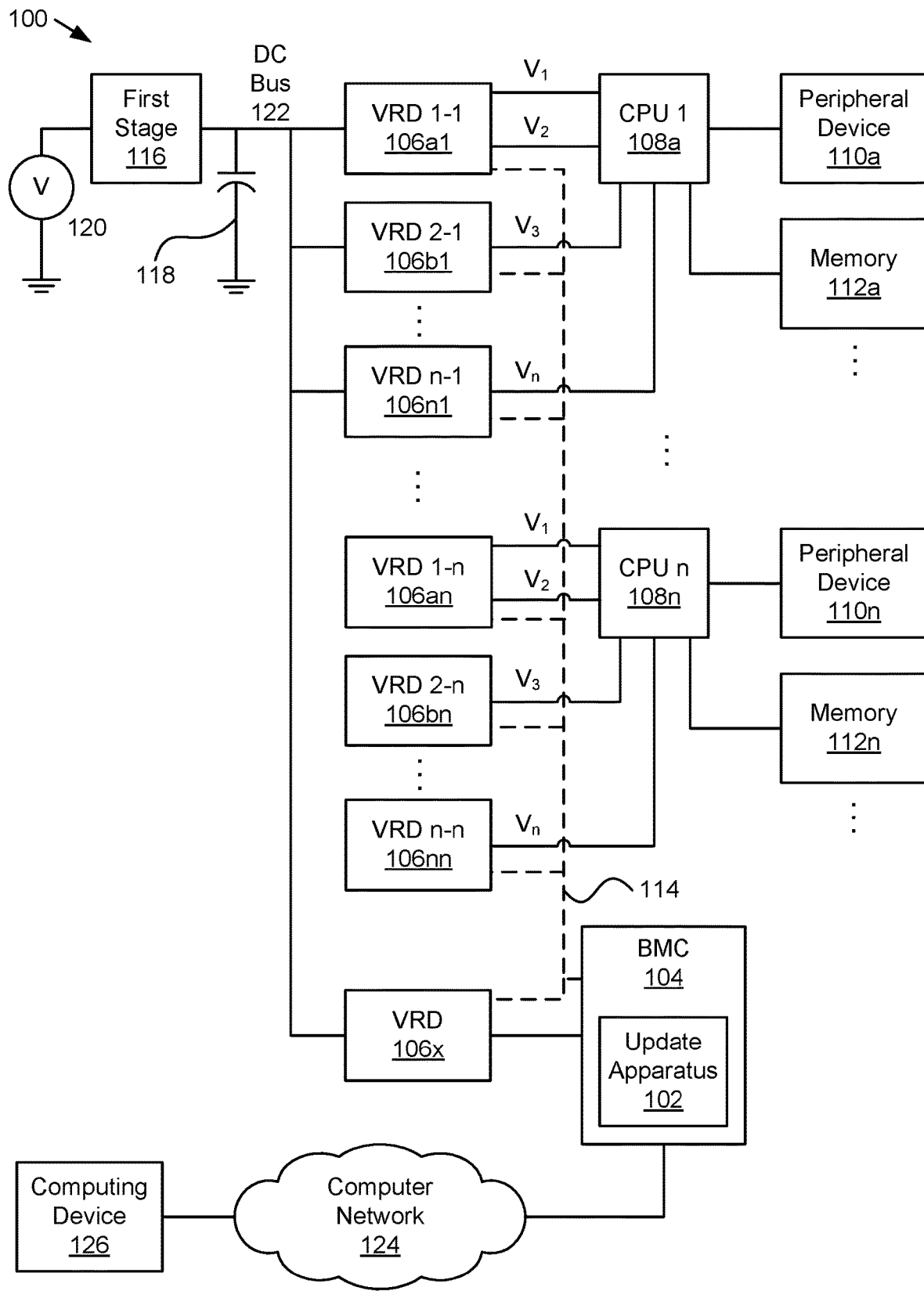
FIG. 1 is a schematic block diagram illustrating one embodiment of a system for voltage regulation device adjustment.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for voltage regulation device adjustment. The system 100 includes an update apparatus 102 in a baseboard management controller ("BMC") 104, voltage regulation devices ("VRDs") 106a1-106n1, a peripheral device 110a, and memory 112a associated with a first central processing unit ("CPU") 1 108a, VRDs 106an-106nn, a peripheral device 110n, and memory 112n associated with an $n^{th}$ central processing unit ("CPU") n 108n, a VRD 106x associated with the BMC 104, a management bus 114, a first stage 116, a capacitor 118, a voltage source 120, a direct current ("DC") bus 122, a computer network 124, and a computing device 126, which are described below.

The VRDs 106a1-n1 to 106an-nn (collectively or generically and in any configuration "106"), CPUs 108a-n (collectively "108"), peripheral devices 110a-n (collectively "110"), memory 112a-n (collectively "112"), and BMC 104, in one embodiment, are part of an electronic device. In another embodiment, the electronic device includes the first stage 116, capacitor 118 and DC bus 122. In other embodiments, the electronic device includes VRDs (e.g. 106a1 and possibly more VRDs), but may include other components instead of a CPU, such as a programmable hardware device, like a field programmable gate-array ("FPGA") device, programmable array logic, programmable logic devices, hardware circuits, chips, etc. where the VRDs 106 provide power to the components of the electronic device.

An electronic device in the system 100 includes an update apparatus 102 capable of receiving and updating firmware for the VRDs 106. Firmware is a type of software that provides control, monitoring, and other essential functions in an electronic device. Typically, firmware is installed during a manufacturing process and resides in non-volatile memory within the electronic device. Often, firmware is designed to not change during the lifetime of the electronic device and is typically changed only occasionally, for example to fix a software bug. Frequently, a firmware update takes place during a power-up condition or another situation where the electronic device is not fully functional. Installing new firmware may require flashing a memory location holding the firmware. With advances in flash memory, in other embodiments, the firmware may be installed while the electronic device is operating or in a paused or suspended condition.

The VRD firmware includes settings that serve to configure and control the VRDs 106. The update apparatus 102 determines an efficiency score for a current firmware installed on the VRD 106 based on a number of efficiency factors, compares the efficiency score to a predetermined efficiency score for a different firmware, and selects the different firmware for the VRD 106 if it's efficiency score indicates that it is more efficient than the current firmware installed on the VRD 106. The update apparatus 102 will be discussed further with regard to the apparatuses 200, 300 of FIGS. 2 and 3.

In one embodiment, the system 100 includes one or more VRDs 106a1, 106b1, . . . 106n1 that include more than one output voltage (e.g. $V_1$, $V_2$, etc.). Often a VRD (e.g. 106a1) includes multiple outputs where each output includes a different voltage. The system 100 may include one multi-output VRD per CPU (e.g. VRD 1-1 106a1 for CPU 1 108a, VRD 1-2 106b1 for CPU 2 108b, . . . VRD 2-n 106 and for CPU n 108n). In another embodiment, the system 100 includes multiple VRDs 106, each with a different output voltage (e.g. VRD 1-1 106a1 with output voltage $V_1$, VRD 2-1 106a2 with output voltage $V_2$, etc.). In another embodiment, the system 100 includes VRDs (e.g. VRD 1-1 106a1, VRD 1-2 106ab, . . . VRD 1-n 106nn) with multiple output voltages (e.g. $V_1$ and $V_2$) and other VRDs (e.g. VRD 2-1 106b1, . . . VRD n-1 106 n1, . . . VRD 2-n 106bn . . . VRD n-n 106nn) with one output voltage (e.g. $V_3$ and $V_4$).

Each VRD 106 is typically a DC-to-DC converter that is a switchmode power supply. Typically, a switchmode power supply includes one or more switches that operate between an open and a closed position to connect or disconnect a voltage source, an inductor, etc. Typically, a switchmode power supply includes at least switches, one or more inductive components, and one or more capacitors. In addition, some switchmode power supplies include one or more rectifiers or equivalent device. A switchmode power converter may be derived from a particular topology, such as a buck topology, a boost topology, a Cúk topology, or other topology, which may be derived from a buck topology, a boost topology, etc. A switchmode power converter may be a resonant topology and may include features, such as zero-voltage switching or other technique to improve efficiency.

A switchmode power converter may have a fixed duty cycle at a particular switching frequency or may have a variable switching frequency, for example with a fixed on-time and a variable off time. Other switchmode power converters may have switches that operate during a particular phase of a switching frequency, which may be called a conduction angle.

Switchmode power converters may also have various control techniques, such as controlling output voltage or output current. Other control techniques change switching modes under different conditions, such as for various loading conditions. Other control techniques may change feedback loop parameters for various conditions. One of skill in the art will recognize that there are many possible control techniques that vary switching conditions, setpoint voltages, and the like for various operating conditions where each control technique may offer a different efficiency characteristic for various operating conditions.

A VRD 106 may include multiple switchmode power converters in parallel where each switchmode power converter may be called "phase" so that the VRD 106 is a multiphase VRD 106. Typically, multiphase VRDs 106 includes phases in parallel and the phases may be selected or de-selected. A de-selected phase stops switching to not produce any power where a selected phase continues switching and provides power to an output.

The system 100 includes a BMC 104 that, in one embodiment, includes the update apparatus 102. In other embodiments, all or part of the update apparatus 102 may be located elsewhere within or external to the electronic device. For example, a portion of the update apparatus 102 that determines the efficiency score and/or selects appropriate new firmware may be located external to the electronic device, e.g., such as on a remote server. A BMC 104 may include an FPGA or similar lower level processor or may include a higher level processor, such as a CPU.

Typically, the BMC 104 acts as a controller to monitor the physical state of the electronic device, to monitor sensors related to the electronic device, to communicate with an external computing device 126 over a computer network 124, and to communicate with and control various components of the electronic device, such as the VRDs 106, CPUs 108, etc. Often the load of the BMC 104 is fairly constant and may not vary as much as for other components of the electronic device. A VRD 106x serving the BMC 104 may not need to be updated to improve efficiency of the electronic device, but in some embodiments may also receive new firmware from the update apparatus 102.

The BMC 104 is typically connected to the VRDs 106 and other devices using some type of management bus 114. The management bus 114 may be a serial bus, an Inter-Integrated Circuit ("I²C") bus, a Serial Peripheral ("SPI") bus, a Controller Area Network ("CAN") bus, an ACCESS.bus, a System Management Bus ("SMBus"), a Power Management Bus ("PMBus"), an Intelligent Platform Management Bus ("IPMB"), or the like. The management bus 114 may be used to load new firmware onto one or more VRDs 106 of the electronic device.

The electronic device is configurable with various components and/or different numbers of the same component. For example, the electronic device may include a printed circuit board with sockets, connectors, bays, etc. for the various components. For example, the electronic device may come with a single CPU (e.g. CPU 1 108a) and may include sockets for one or more additional CPUs 108. The electronic device may also include other components powered directly by the VRDs 106 or through other components by the VRDs 106 of the electronic device.

The electronic device may also be configured for expansion to include additional memory 112, other peripheral devices 110, non-volatile storage devices, etc. The components, such as memory 112, may be internal to the electronic device through an internal bus, such as a front-side bus, or other internal bus type. The components may also be connected through a computer bus, such as a Universal Serial Bus ("USB"), a Serial AT Attachment ("Serial ATA" or "SATA") bus, a Parallel ATA bus, a Peripheral Component Interconnect ("PCI") bus, a PCI Express ("PCIe") bus, non-volatile memory express ("NVM Express" or "NVMe"), a storage area network ("SAN"), and the like, either internally or externally. Components, such as hard disk drives ("HDD"), solid state drives ("SSD"), non-volatile memory ("NVM"), etc. may be internal or external to the electronic device and may receive power from the VRDs 106. Likewise, other peripheral devices 110 used to get information into or out of the electronic device, such as a keyboard, a mouse, a speaker, a monitor, etc. may draw power from the VRDs 106 of the electronic device.

The system 100 may also include a first stage 116 that conditions incoming power from a voltage source 120, which may be AC or DC power. The VRDs 106, in one embodiment are second stages to the first stage 116 with a DC bus 122 between the first stage 116 and the VRDs 106. The DC bus 122 may include one or more capacitors 118, which may stabilize voltage of the DC bus 122 and may also form a portion of a low pass filter that may service to filter out some switching frequencies. Often the first stage 116 includes a rectifier stage when the voltage source 120 provides AC power where the rectifier stage rectifies the AC voltage. The first stage 116 may also include one or more inductors along with the capacitor(s) 118, which may form a low pass filter to filter out the fundamental frequency of the voltage source 120.

In other embodiments, the first stage 116 is an active stage with switching components. The active stage may be a switchmode converter of some type. For example, the first stage 116 may include an active power factor correction stage that serves to correct power factor, remove harmonics, etc., of the electronic device as seen from the voltage source 120. In another embodiment, the first stage 116 includes an active stage that changes a DC input voltage, either from the voltage source 120 or from a rectifier stage to a desired voltage of the DC bus 122. For example, the voltage source 120 may provide 48 volts ("V") and the DC bus 122 voltage may be 12 V, so an active stage in the first stage 116 may convert 48 V to 12 V. In one embodiment, a VRD 106 provides power to components of the first stage 116. One of skill in the art will recognize other configurations of the first stage 116.

A computing device 126 and a computer network 124, in one embodiment, are part of the system 100. In another embodiment, the computing device 126 and/or the computer network 124 are connected to the system 100, but are not part of the system 100. The computing device 126, for example, may be a client, a computer of a system administrator, etc. The computing device 126, in one embodiment, is connected to the BMC 104 and may be a source for VRD firmware. The computing device 126 may transmit one or more VRD firmware to the BMC 104 for distribution to the VRDs 106.

The computer network 124 may be local area network ("LAN"), a wide area network ("WAN"), may include the Internet, may include a wireless connection, may include a storage area network ("SAN"), or the like. The computer network 124, in one embodiment, includes cables, switches, routers, etc. that are typically part of a computer network 124. In one embodiment, the computer network 124 includes more than one network. For example, the computer network 124 may include a LAN from the BMC 104 which is connected to the Internet, which is connected to another LAN connecting the computing device 126.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The system 100, in one embodiment, is embodied by a computing device that includes the VRDs 106, the BMC 104, the CPUs 108, the peripheral devices 110, the memory 112, the first stage 116, etc. In another embodiment, the system 100 is embodied by multiple components in a computer rack that may include blade servers, a backplane, a rack-mounted power device with the first stage 116, etc.

The system 100, in one embodiment, is located in a data center. The data center may include any facility that houses the electronic device. The data center typically includes some form of heating, ventilating and air conditioning ("HVAC") equipment to keep at least the exterior of the electronic device within a desired temperature range. The data center may also include specific cooling for the electronic device, such as cooling of rack-mounted devices, fans, liquid cooling, and the like. A rule of thumb is that for every watt of energy used by an electronic device, another watt of cooling may be required for cooling the space around the electronic device so that where the electronic system operates more efficiently, power for cooling may be reduced.

Figure 2:
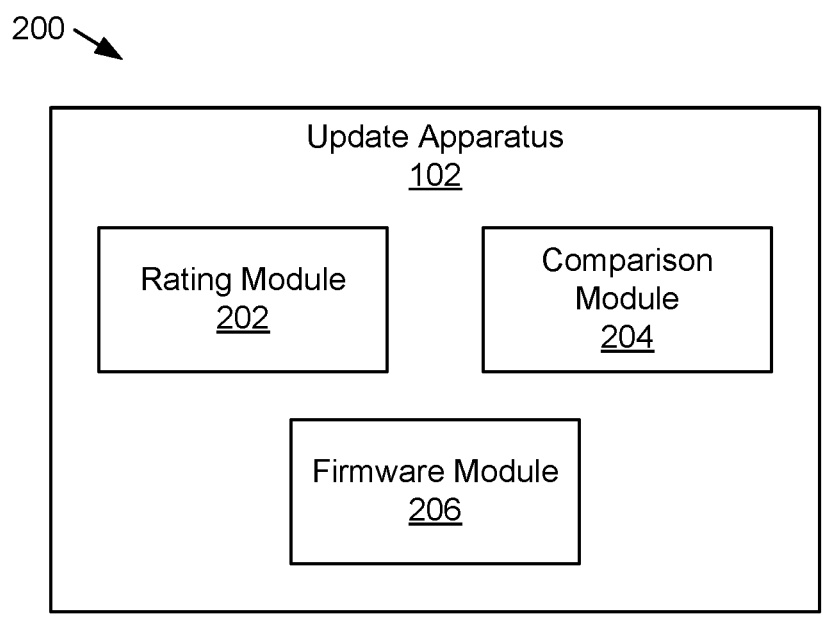
FIG. 2 is a schematic block diagram illustrating one embodiment of an apparatus for voltage regulation device adjustment.

FIG. 2 is a schematic block diagram illustrating one embodiment of an apparatus 200 for voltage regulation device adjustment. The apparatus 200 includes one embodiment of the update apparatus 102, which includes a rating module 202, a comparison module 204, and a firmware module 206, which are described below.

The rating module 202 determines an efficiency score for a current firmware of a VRD 106. As used herein, an efficiency score for a VRD firmware describes, indicates, measures, or the like a power efficiency (e.g., an amount of power or energy loss) for a VRD 106 based on a configuration of an electronic device where the VRD 106 is installed. The efficiency score, for example, may be represented as a percentage, a value on a predefined scale (e.g., a scale of 1-100), or any other value that may be compared with another value.

The electronic device may include a non-volatile storage medium that stores multiple different VRD firmware that can be installed in a VRD 106. Each VRD firmware stored on the electronic device may have an associated efficiency score. The efficiency score for a VRD firmware may be a default efficiency score assigned to each VRD firmware. The efficiency score may be determined based on lab testing, usage outside of the electronic device, baseline testing, and/or the like, e.g., by a manufacturer of the firmware and/or the VRD 106, prior to the firmware being installed in the VRD 106 or stored on the electronic device. The efficiency score may be determined, calculated, and/or updated over time when it is installed in a VRD 106 that is actively used by the electronic device.

For example, as described in more detail below, the rating module 202 may determine the efficiency score for a VRD firmware based on various characteristics and configurations of the electronic device that may affect the power efficiency of one or more VRDs 106. For example, the efficiency score may be based on the hardware configuration of the electronic device, e.g., the number and types of hardware components installed in the electronic device, how the hardware components are used while the electronic device is active, and/or the like. The efficiency score may also be based on one or more applications that are executing on the electronic device and that use the hardware components in various ways to execute, which may affect the power efficiency of the VRDs 106 that regulate the power provided to the hardware components.

In one embodiment, each firmware adjusts settings within the VRDs 106. For example, the settings within the VRDs 106 include an output voltage setpoint, a current setpoint, a control parameter, a parameter of a component within the VRDs 106, and/or a switching parameter, such as maximum duty cycle, conduction angle limits, etc. The settings within the VRDs 106 may include any VRD setting, such as those described above. In another embodiment, the settings within the VRDs 106 include selection or de-selection of one or more phases of the VRDs 106 for operation. As described above, the one or more phases of a VRD 106 include switchmode power converters connected in parallel, where each switchmode power converter provides power from the VRD when selected.

The rating module 202, in certain embodiments, checks, determines, calculates, or the like the efficiency score of the current firmware of an VRD on an ongoing basis, at predetermined intervals (e.g., every 500 milliseconds ("mS") or every million clock cycles), at predetermined periods of time, and/or the like. In one embodiment, the rating module 202 may allow the VRD 106 to run with the current firmware for a predetermined period of time, e.g., a "burn-in" period, before determining an efficiency score for the current firmware. This may provide a more accurate efficiency score based on the hardware configuration and/or the application/software configuration of the electronic device. In some embodiments, the rating module 202 uses the "burn-in" period to determine an initial or baseline efficiency score for the current firmware if the current firmware has not been previously loaded, tested, or does not have a pre-assigned or default efficiency score.

The comparison module 204 compares the determined efficiency score for the current firmware installed in the VRD 106 to a predetermined efficiency score for a different firmware for the VRD 106. In one embodiment, the comparison module 204 compares the efficiency score of the current VRD firmware with the efficiency score of each of multiple different VRD firmware associated with a VRD 106 that are stored on the non-volatile storage medium, and which may be accessed and installed on an associated VRD 106 in real-time, during startup or boot time (e.g., after the electronic device starts up, but before an operating system is loaded), and/or the like.

For example, firmware A may be installed on a VRD 106 and may have an efficiency score of 87, as determined by the rating module 202. The comparison module 204 may compare the efficiency score, 87, to a predetermined efficiency score of each of the VRD firmware stored on the electronic device and installable on the particular VRD 106 to determine whether there is an available firmware that is more power or energy efficient than the currently installed firmware as indicated by the efficiencies scores.

In some embodiments, the comparison module 204 compares the efficiency score of the current firmware to the efficiency scores of the other available firmware in response to the rating module 202 determining the efficiency score of the current firmware, at predetermined intervals, at predetermined periods of time, and/or the like.

The firmware module 206 selects the different firmware for the VRD in response to determining that the VRD is less efficient with the current firmware than with the different firmware based on the comparison of the efficiency score for the current firmware with the predetermined efficiency score for the different firmware. For example, the firmware module 206 may overwrite (e.g., flash a ROM for the VRD 106) or otherwise uninstall the current firmware installed on the VRD 106 with the new or different firmware that has a better efficiency score for the current hardware and application configuration for the electronic device.

In one embodiment, the firmware module 206 selects the different firmware for the VRD in response to the efficiency score of the current firmware being outside a threshold range of the efficiency score of the different firmware. For example, if the efficiency score for the current firmware is 89 for the configuration of the electronic device, and a different firmware has an efficiency score of 90, then it may not be feasible, and in fact may be less efficient, to switch to the different firmware because the efficiency score for the current firmware may fluctuate between 88 and 92, for example. Thus, in such an example, the firmware module 206 would constantly be switching the VRD firmware between the current firmware and the different firmware.

To avoid this situation, the firmware module 206 may set a threshold range, based on historical performances of the various VRD firmware and different configurations of the electronic device, based on user input, or the like, of the efficiency score of the different firmware such that if the efficiency score of the current firmware is within the range of the efficiency score of the different firmware, the firmware module 206 does not switch the current firmware for the different firmware. For example, if the threshold range for a particular firmware is ±3, and that particular firmware has an efficiency score of 90, if the efficiency score of the current firmware is 88, then the firmware module 206 will not select the different firmware; however, if the efficiency score of the current firmware is 86, then the firmware module 206 will select the different firmware because the efficiency score for the current firmware is outside the ±3 threshold range.

In one embodiment, a VRD 106 is connected to a management bus 114 and the firmware module 206 receives the new firmware over the management bus 114. In another embodiment, the management bus 114 is connected to a BMC 104 associated with the electronic device. The BMC 104 may be connected to a computer network 124 external to the electronic device, and the firmware module 206 may receive the new firmware, via the BMC 104, over the computer network 124.

Figure 3:
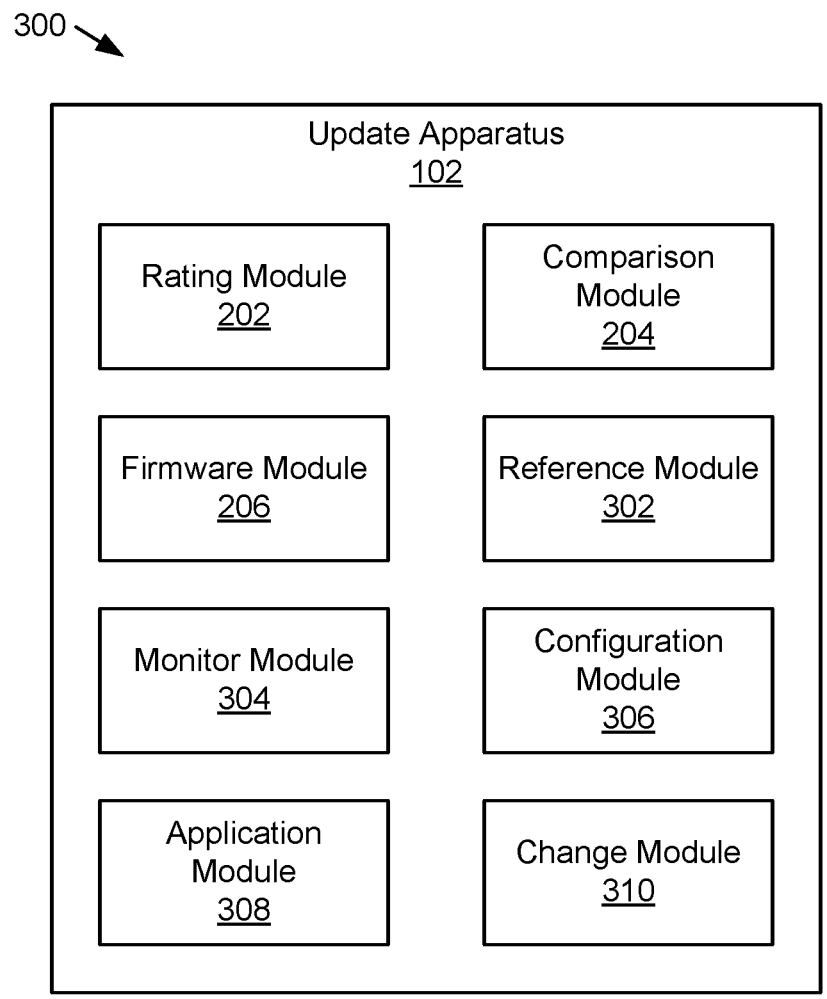
FIG. 3 is a schematic block diagram illustrating another embodiment of an apparatus for voltage regulation device adjustment.

FIG. 3 is a schematic block diagram illustrating another embodiment of an apparatus 300 for voltage regulation device adjustment. The apparatus 300 includes another embodiment of the update apparatus 102 with a rating module 202, a comparison module 204, and a firmware module 206, which are substantially similar to those described above in relation to the apparatus 200 of FIG. 2. In various embodiments, the apparatus 300 includes a reference module 302, a monitor module 304, a configuration module 306, an application module 308, and/or a change module 310 which are described below.

The reference module 302, in one embodiment, maintains a firmware table comprising one or more entries that each correspond to a different firmware for the VRD 106. In some embodiments, each entry includes a firmware (or an identifier associated with a firmware stored on the electronic device), a configuration for the electronic device (e.g., an identifier for the hardware and/or application configuration for the electronic device), and an efficiency score for the firmware based on the configuration of the electronic device.

In one embodiment, the reference module 302 dynamically builds or creates the firmware table when the electronic device is powered on for the first time, e.g., after being received from a manufacturer, when a new firmware for the VRD 106 is available, when the configuration of the electronic device has changed, or the like. In such an embodiment, each available VRD firmware stored on the electronic device may not have an efficiency score for the associated configuration of the electronic device (e.g., may not have a default efficiency score, an efficiency score based on manufacturer testing, or an otherwise determined efficiency score). Thus, the firmware module 206 may select a first VRD firmware for a VRD 106, and allow the electronic device to run for a predetermined amount of time (e.g., a "burn-in" period) under a simulated or real workload so that the rating module 202 can determine an efficiency score for the firmware. The reference module 302 may then create an entry in the firmware table for the firmware that includes the associated efficiency score. The firmware module 206 may then select a different available firmware for the VRD 106 that does not have an efficiency score for the electronic device's configuration so that the VRD 106 can run with the different firmware for a period of time, an efficiency score for the firmware can be determined, and an entry in the firmware table can be created for the firmware, and so on until each available firmware has a baseline or associated efficiency score for the configuration of the electronic device.

In some embodiments, the reference module 302 dynamically updates the firmware table for the current firmware based on the determined efficiency score for the current firmware and the configuration of the electronic device. For example, as described above, the rating module 202 may determine the efficiency score for the current firmware installed in the VRD 106 on an ongoing basis, such as every second. In response to the rating module 202 determining a new efficiency score for the current firmware configuration, the reference module 302 may create or update an entry in the firmware table to reflect the new efficiency score.

In one embodiment, the comparison module 204 compares the efficiency score for the current firmware to the efficiency score of each firmware entry listed in the firmware table to determine whether there is a firmware for the VRD 106 that is more efficient than the current firmware. In such an embodiment, the comparison module 204 may further filter the entries in the table based on the hardware and/or application configuration of the electronic device. For example, if the electronic device has hardware configuration A and executes application B, the comparison module 204 may only search entries in the firmware table that are for firmware that have efficiencies scores associated with hardware configuration A and application B.

The firmware module 206, in certain embodiments, selects the new or different firmware from the firmware table based on the configuration of the electronic device and the efficiency score, based on the comparison performed by the comparison module 204. The firmware module 206, for example, may determine an identifier or a memory location of the selected firmware from the entry in the firmware table, read or access the firmware from the memory location, and install the firmware on the VRD 106 in real-time, at the next startup, or the like.

In one embodiment, the monitor module 304 monitors one or more power efficiency characteristics associated with a VRD 106 while the VRD is loaded with the current firmware. The monitor module 304 may monitor the power efficiency characteristics on an ongoing basis, such as at predetermined intervals or periods of time, in real-time, and/or the like. The rating module 202, in some embodiments, determines the efficiency score for the current firmware at a certain point in time based on the one or more power efficiency characteristics.

In one embodiment, the one or more power efficiency characteristics include a temperature associated with a VRD 106. Often, temperature is used as an indication of power or energy loss, i.e., the higher the temperature, the less power efficient a certain component is. In one embodiment, the monitor module 304 checks a temperature associated with a VRD 106 such as an ambient temperature associated with the electronic device where the VRD 106 is installed (e.g., an ambient temperature inside the electronic device's enclosure, an external ambient temperature such as within a data center, etc.), the temperature of a CPU coupled to the VRD 106, the temperature of a memory unit associated with the VRD 106, the temperature of a peripheral device associated with the VRD 106, and/or the like. The rating module 202 may factor the temperature readings as part of the efficiency score, e.g., higher temperatures or temperatures above a baseline temperature may decrease the efficiency score for the current firmware.

In one embodiment, the one or more power efficiency characteristics include various utilization measurements of a VRD 106. As used herein, the VRD utilization measurements may indicate how close the VRD 106 is to its capacity. If the VRD 106 is running at or above its rated capacity, for example, then it may be less power efficient. The utilization measurements of the VRD 106, in some embodiments, include a measurement of an input voltage, an output voltage, an input current, an output current, and/or the like. The rating module 202 may factor the utilization measurements as part of the efficiency score for the current firmware, e.g., a higher VRD utilization may decrease the efficiency score for the current firmware.

In a further embodiment, the configuration of the electronic device includes a hardware configuration and/or an application or software configuration for each application executing on the electronic device. In certain embodiments, the configuration module 306 determines a hardware configuration for the electronic device. The configuration module 306 may determine the hardware configuration for the electronic device by determining which hardware components are installed and which component sockets, bays, cables, etc., are empty, not connected, etc.

In one embodiment, the components of the electronic device include a particular component type and the components may include a CPU 108, a programmable hardware device, a memory device 112, a non-volatile storage device, a peripheral device 110, a computer bus connected device, and/or the like. In another embodiment, determining the configuration of the electronic device includes determining a model number of a component and information relating to the model of the component. For example, a CPU 108 may range from 80 watts ("W") to 200 W so that each CPU model is capable of using a different amount of power and each CPU type may require a different VRD firmware.

In a further embodiment, the configuration module 306 determines a hardware configuration for the electronic device by monitoring one or more performance characteristics of a hardware component while the hardware component is active. For example, the configuration module 306 may monitor the performance of a CPU to determine its clock speed; may monitor a hard drive to determine its read/write speed, and/or the like.

In addition, for installed components, the configuration module 306 may determine a model number, product identifier, or the like, and corresponding performance information based on them model number so that the firmware module 206 may select appropriate VRD firmware for the particular hardware configuration. The configuration module 306 is similar to the configuration module 202 in U.S. patent application Ser. No. 15/295,894 filed Oct. 17, 2016, titled "Power Delivery Optimization Based on System Capability," for Luke Remis, et al. [hereinafter "the System Capability Application"], which is incorporated herein by reference for all purposes.

The application module 308, in one embodiment, determines an application running on the electronic device and one or more effects of the application on one or more components of the electronic device. The rating module 202 may determine an efficiency score based on the effects of the application on the one or more components of the electronic device. For example, the application module 308 may interface with the CPUs 108, the BMC 104, and/or the computing device 126 to determine which applications are running on the various CPUs 108 and/or the effects of the applications on the various components of the electronic device.

For example, a particular application may use around 50% of the capacity of a CPU 108 while another application may use 90% of the capacity of the CPU 108. Using 90% of the capacity of the CPU 108 may use more power than using 50% of the capacity of the CPU 108. In addition, some applications may be memory intensive, peripheral intensive, etc. so that an application may affect memory 112, peripheral devices 110, etc., in different ways, which affects power consumption. The application module 308 takes into account which applications are running or will run during a time period along with the effects of the application(s), which the rating module 202 may use to determine an efficiency score for the current firmware of the VRD 106.

The firmware module 206, in one embodiment, selects the new firmware in response to the efficiency score, which may be determine at least in part on the effects of the hardware configuration and/or the application configuration.

The change module 310, in one embodiment, detects a change in the configuration of the electronic device. For example, the change module 310 may detect a new application that is executing, an application that is no longer executing, a new hardware component, the removal of a hardware component, failure of a hardware component, or the like. In response to the changed configuration, the change module 310 may invoke the rating module 202 to determine an efficiency score for the current VRD firmware, and ultimately determine whether the current VRD firmware is the best firmware for the VRD in terms of efficiency given the changed configuration of the electronic device.

In such an embodiment, the change module 310 and/or the rating module 202 may allow the VRD 106 to execute with the current firmware to gauge, calculate, or otherwise determine an accurate efficiency score for the current firmware based on the changed configuration before determining whether a different firmware is more efficient for the VRD 106. If, after a predetermined period of time, the comparison module 204 determines that a different firmware is better suited for the new configuration, the firmware module 206 selects and loads the different firmware in real-time, at the next startup period for the electronic device, and/or the like.

Figure 4:
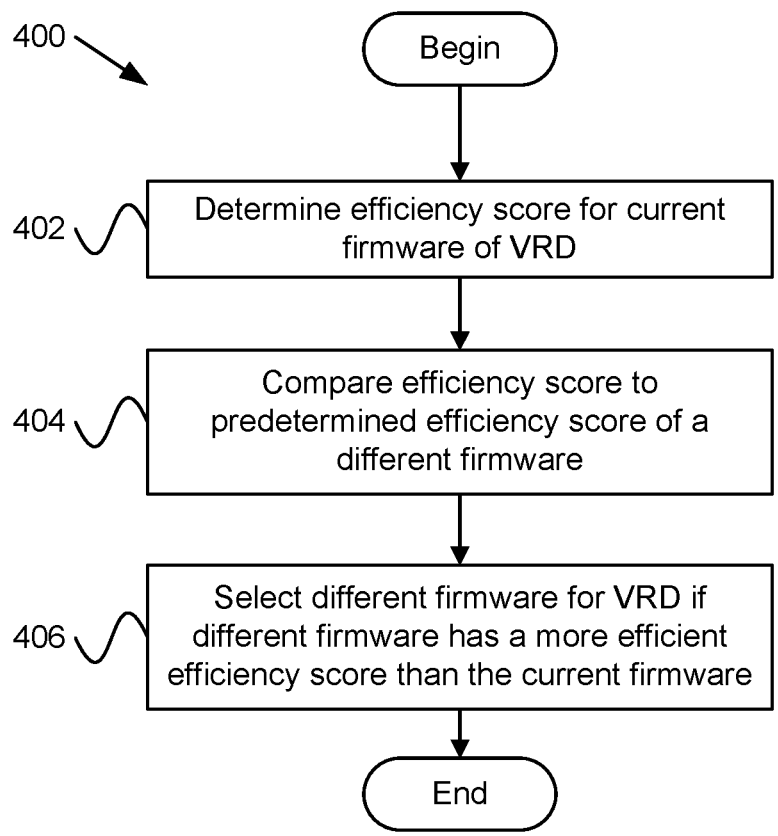
FIG. 4 is a schematic flow chart diagram illustrating one embodiment of a method for voltage regulation device adjustment.

FIG. 4 is a schematic flow chart diagram illustrating one embodiment of a method 400 for voltage regulation device adjustment. The method 400 begins and determines 402 an efficiency score for a current firmware of a VRD 106. The efficiency score describes a power efficiency for the VRD 106 based on a configuration of an electronic device where the VRD 106 is installed. The method 400 compares 404 the determined efficiency score for the current firmware with a predetermined efficiency score for a different firmware for the VRD 106. The method 400 selects 406 the different firmware for the VRD 106 in response to determining that the VRD 106 is less efficient with the current firmware than with the different firmware based on the comparison of the efficiency score for the current firmware with the predetermined efficiency score for the different firmware, and the method 400 ends. In some embodiments, the rating module 202, the comparison module 204, and the firmware module 206 perform the various steps of the method 400.

Figure 5:
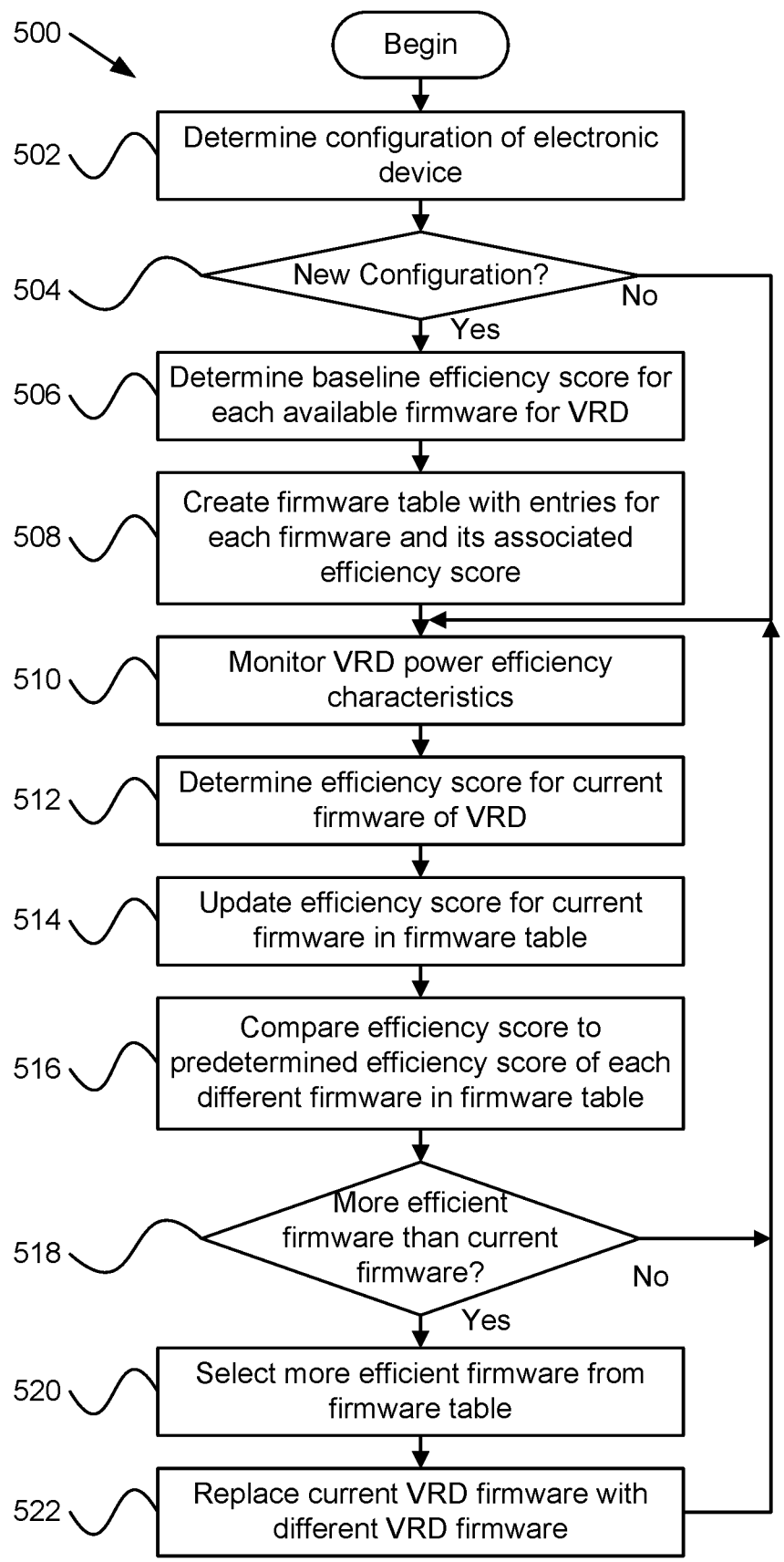
FIG. 5 is a schematic flow chart diagram illustrating another embodiment of a method for voltage regulation device adjustment.

FIG. 5 is a schematic flow chart diagram illustrating one embodiment of a method 500 for voltage regulation device adjustment. In one embodiment, the method 500 begins and, in one embodiment, determines 502 a configuration of an electronic device where the VRD 106 is installed. The configuration may include a hardware and/or application configuration. The method 500, in some embodiments, determines 504 whether the configuration is new, has changed, has been modified, includes new firmware available for the VRD 106, or the like. If so, the method 500, in further embodiments, determines 506 a baseline efficiency score for each firmware available for the VRD 106 on the electronic device. For example, the method 500 may install a firmware on the VRD 106, allow it to run for a predetermined period of time under a workload so that an accurate efficiency score can be determined for the firmware, install a new or different firmware on the VRD 106, allow it to run for a predetermined period of time to determine an efficiency score for the firmware, and so on until each available firmware has an efficiency score for the particular configuration of the electronic device.

The method 500, in one embodiment, creates 508 a firmware table that includes entries for each firmware. The entries may include an identifier for the firmware, an identifier for the configuration of the electronic device (e.g., an identifier for the hardware configuration and an identifier for the application configuration), and the firmware's efficiency score. The method 500, monitors 510 one or more power efficiency characteristics associated with a VRD 106 with a current firmware loaded, such as various temperature characteristics, VRD utilization characteristics, and/or the like, which may be based on the configuration of the electronic device and affect the power efficiency of the VRD 106.

The method 500 determines 512 an efficiency score for the current firmware of the VRD 106 based on the configuration of the electronic device and/or the VRD performance characteristics. The method 500, in some embodiments, updates 514 an entry for the current firmware in a firmware table with the determined efficiency score for the current firmware. The method 500 compares 516 the determined efficiency score for the current firmware with a predetermined efficiency score for a different firmware in the firmware table, and determines 518 whether a different firmware has a better efficiency score than the current firmware for the configuration of the electronic device.

If the method 500 determines 518 that the current firmware is the most efficient firmware for the VRD 106 based on its efficiency score, the method 500 continues to monitor 510 the power efficiency characteristics for the VRD 106. Otherwise, the method 500 selects 520 the different firmware for the VRD 106 that has a better efficiency score, and replaces 522 the current firmware with the different firmware in VRD 106, and the method 500 ends. In some embodiments, the rating module 202, the comparison module 204, the firmware module 206, the reference module 302, the monitor module 304, the configuration module 306, the application module 308, and the change module 310 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:

a rating module that determines an efficiency score for a current firmware of a voltage regulation device ("VRD") located in an electronic device, the VRD providing power to components of the electronic device, the efficiency score describing a power efficiency for the VRD based on a configuration of the electronic device where the VRD is installed, wherein the power efficiency for the VRD comprises a ratio of output power of the VRD to input power of the VRD, wherein the input power is proportional to a product of input voltage and input current of the VRD and the output power is proportional to a product of output voltage and output current of the VRD;

a comparison module that compares the determined efficiency score for the current firmware with a predetermined efficiency score for one or more different firmware for the VRD, wherein the efficiency score of each of the one or more different firmware are for the configuration of the electronic device; and a firmware module that selects a different firmware of the one or more different firmware for the VRD in response to determining that the VRD is less efficient with the current firmware than with the selected different firmware based on the comparison of the efficiency score for the current firmware with the predetermined efficiency score for the different firmware and loads the different firmware in the VRD for execution by the VRD, wherein said modules comprise one or more of hardware circuits, a programmable hardware device and executable code executing on a processor, wherein when said modules comprise executable code the apparatus further comprises the processor.

2. The apparatus of claim 1, further comprising a reference module that maintains a firmware table comprising one or more entries that each correspond to a different firmware for the VRD, each entry comprising a firmware, a configuration for the electronic device, and an efficiency score for the firmware based on the configuration of the electronic device.

3. The apparatus of claim 2, wherein the reference module dynamically updates the firmware table for the current firmware based on the determined efficiency score for the current firmware and the configuration of the electronic device.

4. The apparatus of claim 2, wherein the firmware module selects the different firmware from the firmware table according to the configuration of the electronic device and the efficiency score of the different firmware associated with the configuration of the electronic device.

5. The apparatus of claim 1, further comprising a monitor module that monitors, on an ongoing basis, one or more power efficiency characteristics associated with the VRD while the VRD is loaded with the current firmware, the rating module determining the efficiency score for the current firmware at a certain point in time based on the one or more power efficiency characteristics, wherein monitoring the one or more power efficiency characteristics are in addition to monitoring power efficiency of the VRD.

6. The apparatus of claim 5, wherein the one or more power efficiency characteristics comprise a temperature associated with the VRD, the temperature comprising one or more of an ambient temperature associated with the electronic device, a temperature of a central processing unit ("CPU"), a temperature of a memory unit, and a temperature of a peripheral device.

7. The apparatus of claim 5, wherein the one or more power efficiency characteristics comprise a VRD utilization, the VRD utilization determined based on a measurement of one or more of the input voltage, the output voltage, the input current, and the output current.

8. The apparatus of claim 1, wherein the configuration of the electronic device comprises one or more of a hardware configuration for the electronic device and an application configuration for each of one or more applications executing on the electronic device, wherein the rating module determines the efficiency score for the current firmware based on the configuration of the electronic device.

9. The apparatus of claim 8, further comprising a configuration module that determines the hardware configuration of the electronic device, wherein determining the hardware configuration comprises determining which hardware components are installed in the electronic device and information about the installed components, the information about a hardware component determined based on a model number for the hardware component and one or more performance characteristics of the hardware component that are monitored while it is active.

10. The apparatus of claim 8, further comprising an application module that determines the application configuration for each of the one or more applications executing on the electronic device and one or more effects of each application on one or more hardware components of the electronic device, the one or more effects of an application determined based on one or more of user input and one or more performance characteristics of the application that are monitored while it executes.

11. The apparatus of claim 1, wherein the firmware module selects the different firmware in response to the efficiency score of the current firmware being outside a threshold range of the efficiency score of the different firmware.

12. The apparatus of claim 1, further comprising a change module that detects a change in the configuration of the electronic device, and determines a firmware for the VRD that has a best efficiency score for the changed configuration.

13. The apparatus of claim 12, wherein the firmware module loads the different firmware in the VRD in real-time in response to the change module detecting the change in the configuration of the electronic device.

14. The apparatus of claim 1, wherein a firmware for the VRD manages one or more power settings of the VRD based on the configuration of the electronic device where the VRD is installed.

15. The apparatus of claim 14, wherein the one or more power settings of the VRD comprise:
one or more of an output voltage setpoint, a current setpoint, a control parameter, a parameter of a component within the VRD, and a switching parameter, and/or selection of one or more phases of the VRD for operation, wherein the one or more phases comprise switchmode power converters connected in parallel, wherein each switchmode power converter provides power from the VRD when selected.

16. The apparatus of claim 1, further comprising the electronic device.

17. The apparatus of claim 1, wherein the VRD provides power directly to a processor of the electronic device.

18. A method comprising:
determining an efficiency score for a current firmware of a voltage regulation device ("VRD") located in an electronic device, the VRD providing power to components of the electronic device, the efficiency score describing a power efficiency for the VRD based on a configuration of the electronic device where the VRD is installed, wherein the power efficiency for the VRD comprises a ratio of output power of the VRD to input power of the VRD wherein the input power is proportional to a product of input voltage and input current of the VRD and the output power is proportional to a product of output voltage and output current of the VRD;

comparing the determined efficiency score for the current firmware with a predetermined efficiency score for one or more different firmware for the VRD, wherein the efficiency score of each of the one or more different firmware are for the configuration of the electronic device; and selecting a different firmware of the one or more different firmware for the VRD in response to determining that the VRD is less efficient with the current firmware than with the selected different firmware based on the comparison of the efficiency score for the current firmware with the predetermined efficiency score for the different firmware; and loading the different firmware in the VRD for execution by the VRD.

19. The method of claim 18, further comprising:
maintaining a firmware table comprising one or more entries that each correspond to a different firmware for the VRD, each entry comprising a firmware, a configuration for the electronic device, and an efficiency score for the firmware based on the configuration of the electronic device;

dynamically updating the firmware table for the current firmware based on the determined efficiency score for the current firmware and the configuration of the electronic device; and selecting the different firmware from the firmware table according to the configuration of the electronic device and the efficiency score of the different firmware associated with the configuration of the electronic device.

20. A computer program product comprising a non-transitory computer readable storage medium having program instructions embodied therewith, the program instructions executable by a processor to cause the processor to:
determine an efficiency score for a current firmware of a voltage regulation device ("VRD") located in an electronic device, the VRD providing power to components of the electronic device, the efficiency score describing a power efficiency for the VRD based on a configuration of the electronic device where the VRD is installed, wherein the power efficiency for the VRD comprises a ratio of output power of the VRD to input power of the VRD wherein the input power is proportional to a product of input voltage and input current of the VRD and the output power is proportional to a product of output voltage and output current of the VRD;

compare the determined efficiency score for the current firmware with a predetermined efficiency score for one or more different firmware for the VRD, wherein the efficiency score of each of the one or more different firmware are for the configuration of the electronic device; and select a different firmware of the one or more different firmware for the VRD in response to determining that the VRD is less efficient with the current firmware than with the selected different firmware based on the comparison of the efficiency score for the current firmware with the predetermined efficiency score for the different firmware; and loading the different firmware in the VRD for execution by the VRD.

\* \* \* \* \*